United States Patent
Tuffs et al.

(10) Patent No.: US 9,582,395 B2
(45) Date of Patent: Feb. 28, 2017

(54) CRITICAL SYSTEMS INSPECTOR

(71) Applicant: Netflix, Inc., Los Gatos, CA (US)

(72) Inventors: Philip Simon Tuffs, Pacific Grove, CA (US); Roy Rapoport, Pacifica, CA (US); Ariel Tseitlin, Sunnyvale, CA (US)

(73) Assignee: NETFLIX, INC., Los Gatos, CA (US)

( * ) Notice: Subject to any disclaimer, the term of this patent is extended or adjusted under 35 U.S.C. 154(b) by 394 days.

(21) Appl. No.: 13/826,942

(22) Filed: Mar. 14, 2013

(65) Prior Publication Data
US 2014/0281739 A1  Sep. 18, 2014

(51) Int. Cl.
*G06F 11/00* (2006.01)
*G06F 11/34* (2006.01)
*G06F 11/07* (2006.01)

(52) U.S. Cl.
CPC ........ *G06F 11/3452* (2013.01); *G06F 11/079* (2013.01); *G06F 11/0709* (2013.01); *G06F 11/3409* (2013.01); *G06F 11/3495* (2013.01)

(58) Field of Classification Search
CPC ............... G06F 11/079; G06F 11/0709; G06F 11/3466; G06F 11/3409
See application file for complete search history.

(56) References Cited

U.S. PATENT DOCUMENTS

| | | | |
|---|---|---|---|
| 7,296,194 B1 * | 11/2007 | Lovy et al. | 714/57 |
| 8,806,277 B1 * | 8/2014 | Mullangath | 714/26 |
| 8,892,960 B2 * | 11/2014 | Sambamurthy et al. | 714/47.3 |
| 8,914,499 B2 * | 12/2014 | Houlihan et al. | 709/224 |
| 2002/0022952 A1 * | 2/2002 | Zager et al. | 703/22 |
| 2004/0049565 A1 * | 3/2004 | Keller et al. | 709/223 |
| 2005/0015668 A1 * | 1/2005 | Doyle et al. | 714/25 |
| 2006/0101308 A1 * | 5/2006 | Agarwal et al. | 714/25 |
| 2008/0168044 A1 * | 7/2008 | Barron et al. | 707/4 |
| 2008/0301574 A1 * | 12/2008 | Sanghvi et al. | 715/771 |
| 2009/0313508 A1 * | 12/2009 | Yan | G06F 11/008 714/47.2 |

* cited by examiner

*Primary Examiner* — Philip Guyton
(74) *Attorney, Agent, or Firm* — Artegis Law Group, LLP

(57) ABSTRACT

Techniques are described for identifying a root cause of a pattern of performance data in a system including a plurality of services. Embodiments provide dependency information for each of the plurality of services, where at least one of the plurality of services is dependent upon a first one of the plurality of services. Each of the plurality of services is monitored to collect performance data for the respective service. Embodiments further analyze the performance data to identify a cluster of services that each follow a pattern of performance data. The first one of the services in the cluster of services is determined to be a root cause of the pattern of performance data, based on the determined dependency information for each of the plurality of services.

23 Claims, 11 Drawing Sheets

FIG. 3

CRITICAL SYSTEMS INSPECTOR

BACKGROUND OF THE INVENTION

Field of Invention

Embodiments of the present invention generally relate problem detection in a distributed services-oriented system, and more specifically to techniques for identifying which of a plurality of interconnected and interrelated services is the cause of a given problem(s).

Description of Related Art

Rather than relying on a single large software application to provide every facet of a modern software solution, many software solutions today are made up of a substantial number of different services that are designed to work together to provide the functionality of the software solution. For instance, rather than writing a single standalone application that provides an online content streaming service, such a service could be provided by tens or even hundreds of smaller software services, each designed to perform a specific set of tasks, and that work together to provide the content streaming service. Doing so has several pronounced advantages. For instance, it can be easier to compartmentalize the development of the software application, as each standalone service can be assigned to a small group of programmers for implementation. This helps to alleviate complicated merge operations and troubleshooting operations during the development process, as each standalone service can be compiled and tested individually. Additionally, doing so greatly improves the modularity of the software solution, allowing individual services to be easily removed and replaced with updated services that perform the same task. As yet another advantage, such a modularized design allows the software solution to be easily distributed and redistributed over multiple different compute nodes (either physical or virtual), based on how the different services are positioned and configured.

However, there are drawbacks to such a modularized design as well. For instance, it can potentially be difficult to pinpoint the root cause of a problem in a heavily distributed software solution. For example, consider a solution made up of several hundred interconnected services. In such an environment, a problem occurring in one of the services may adversely affect the performance of several other services, which in turn may adversely affect the performance of still other services. When this occurs, the developers and engineers may have difficulty pinpointing which of the many malfunctioning services originally caused the problem. As another example, when a particular service begins consuming a large amount of system resources, it may be difficult to determine whether an update to the particular service is causing the heavy resource usage, or whether an update to another one of the services is causing the heavy resource usage.

SUMMARY OF THE INVENTION

Embodiments provide a method that includes providing dependency information for each of a plurality of services. Here, at least one of the plurality of services is dependent upon a first one of the plurality of services. The method includes collecting performance data for each respective service of the plurality of services. Additionally, the method includes analyzing the performance data to identify a cluster of services that each follow a pattern of performance data. The method also includes determining the first one of the services in the cluster of services is a root cause of the pattern of performance data, based on the determined dependency information for each of the plurality of services.

Other embodiments include, without limitation, a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 3 illustrates an interface for a monitoring component, according to one embodiment described herein.

DETAILED DESCRIPTION

Although there are numerous advantages to a modularized computing environment, in which a multitude of different services are each designated a specific task or set of tasks, such an environment also introduces several challenges as well. For example, in a computing environment including hundreds of services, each of which may be dependent upon the performance of one or more other services, it can be challenging to quickly diagnose the source(s) of a problem. As used herein, a particular service can be said to be dependent upon another service, when the particular service's performance can be affected by the performance of the other service. In such an environment, when a single service begins to malfunction, the malfunctioning service can impact the performance of other services (e.g., services which depend upon the single service), which in turn can affect the performance of still other services, and so on. As a result, it can be difficult for an administrator to diagnose the root cause of a problem, when a number of different services begin malfunctioning.

As such, embodiments provide techniques for determining dependency information for each of a plurality of services, where at least one of the plurality of services is dependent upon a first one of the plurality of services. Embodiments monitor each of the plurality of services to collect performance data for the respective service. For example, a number of monitoring components could be deployed, where each of the monitoring components is configured to monitor performance metrics for a respective one of the plurality of services. Embodiments could then analyze the performance data to identify a cluster of services that each follow a pattern of performance data. A first one of the services in the cluster of services is then determined to be a root cause of the pattern of performance data, based on the determined dependency information for each of the plurality of services.

Figure 1:
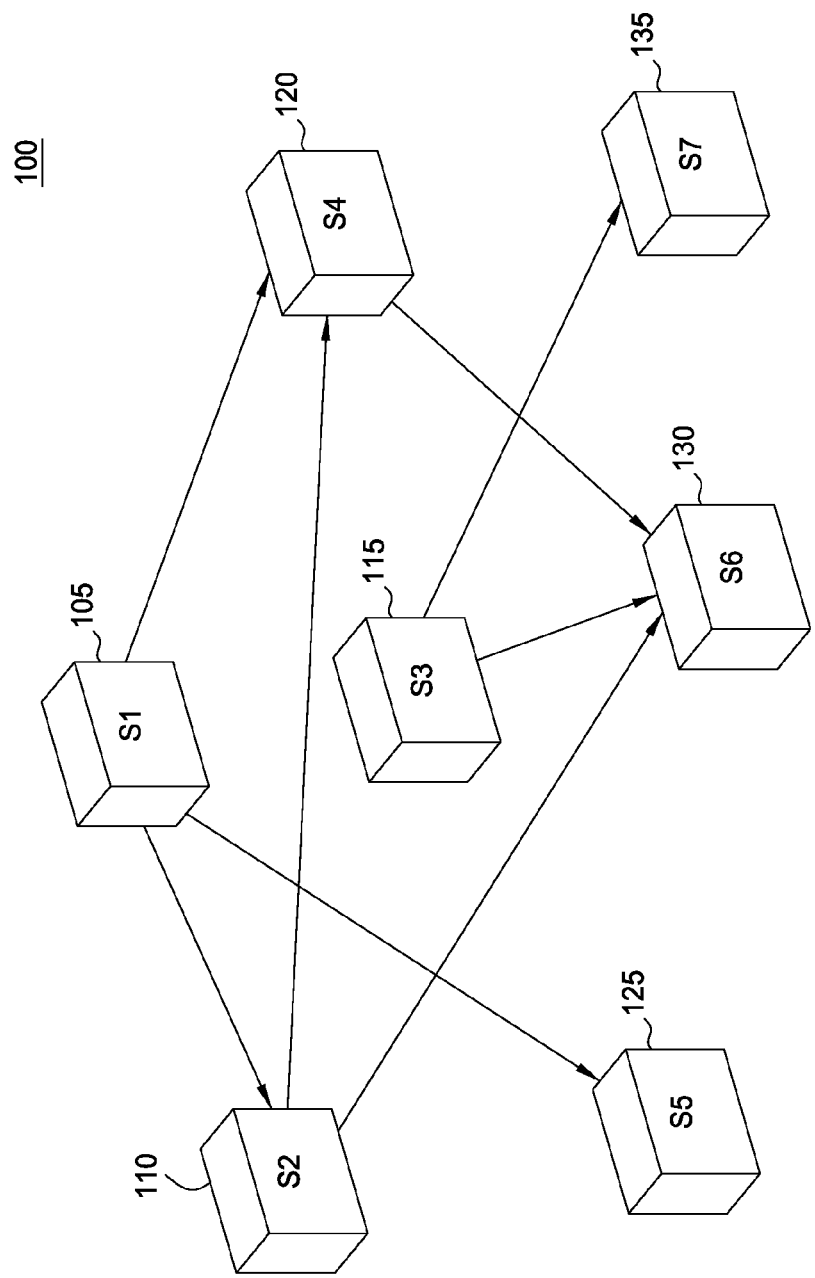
FIG. 1 illustrates a topology of interconnected services, according to one embodiment described herein.

An example of such an environment is shown in FIG. 1, which illustrates a topology of interconnected services, according to one embodiment described herein. As shown, the system 100 includes services 105, 110, 115, 120, 125, 130 and 135. Generally speaking, the services 105, 110, 115, 120, 125, 130 and 135 each represent a software entity, executing on respective hardware resources, that is configured to perform a specific task or set of tasks. For example, the service 105 could be a web application server, which depends on (as indicated by the connecting lines) a web server service 110, an Enterprise Java Bean 3.0 ("EJB3") timer service 125 and a database service 120. That is, the web application server's 105 performance could be tied to the performance of the services 110, 120 and 125, such that the performance of the web application server 105 can be affected by the performance (or lack thereof) of the services 110, 120, 125. For example, if a particular web application hosted on the web application server 105 makes queries to the database service 120, the web application could experience excessive delays in the event the database service 120 begins underperforming (e.g., due to a high workload on the node(s) hosting the database server 120). As another example, in the event the web server 110 stops working, users may be unable to access the web application hosted on the web application service 105. Of course, these examples are provided without limitation and for illustrative purposes only. More generally, it is broadly contemplated that embodiments described herein can be adapted to work with any services and any corresponding dependencies.

Figure 2:
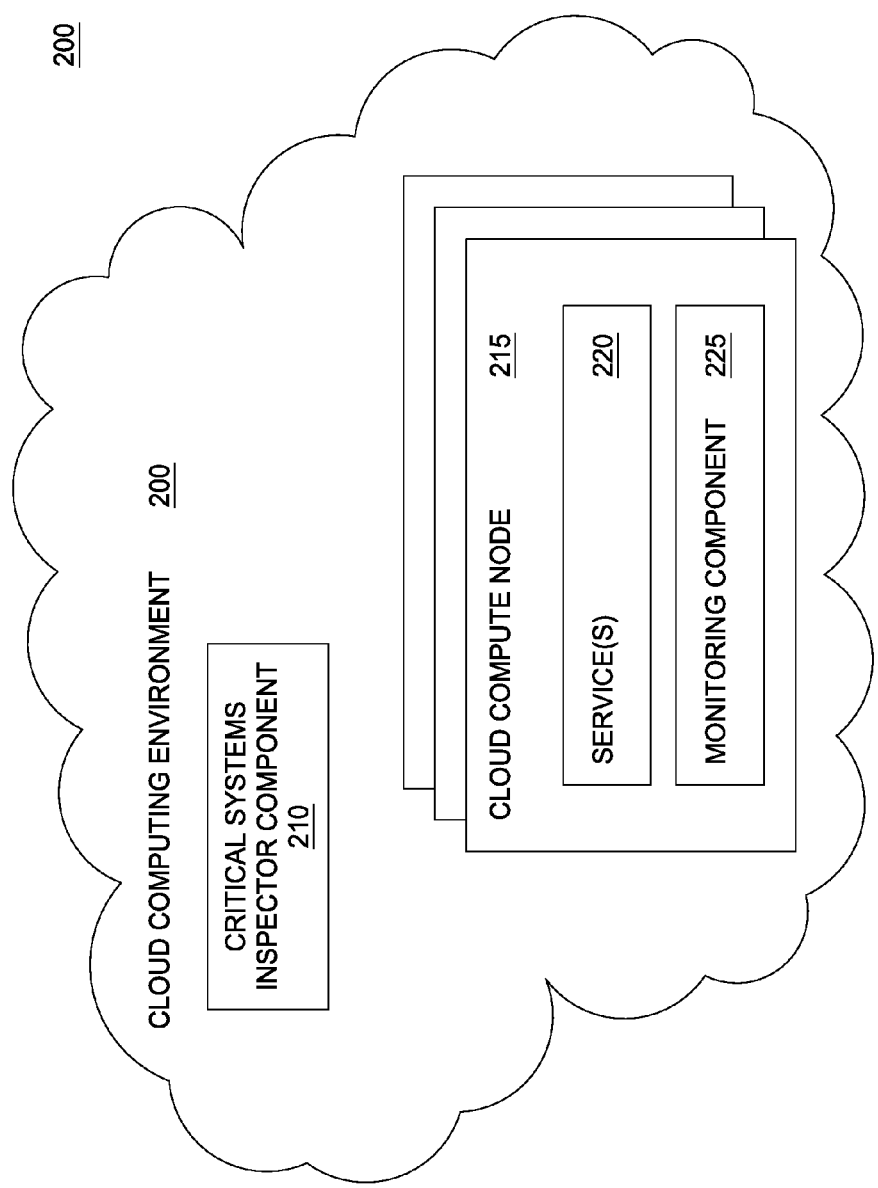
FIG. 2 illustrates a cloud computing environment configured with a critical systems inspector component, according to one embodiment described herein.

As discussed above, embodiments provide techniques for determining dependency information for each of a plurality of services. FIG. 2 illustrates a cloud computing environment configured with a critical systems inspector component, according to one embodiment described herein. As shown, the cloud computing environment 200 includes a critical systems inspector ("CSI") component 210 and a plurality of cloud compute nodes 215. Each of the cloud compute nodes 215 includes a respective one or more services 220 and a respective monitoring component 225. In one embodiment, the compute nodes 215 include a separate monitoring component 225 for each of the one or more services 220 hosted on the node. Alternatively, one monitoring component 225 may be provisioned for a plurality of services 220. Of course, the CSI component 210 may also be running on one or more compute nodes (not shown) of the cloud computing environment.

Generally, the CSI component 210 is configured to collect performance data for the services 220 running on the compute nodes 215, using the monitoring components 225. For instance, each of the monitoring components 225 could be configured to collect data relating to a multitude of different performance metrics for a respective service 220, and to report this data to the CSI component 210. For example, the monitoring components 225 could be configured to write the performance data they collect to a database, and the CSI component 210 could be configured to periodically retrieve this data from the database. As another example, the monitoring components 225 could be configured to directly transmit the performance data to the CSI component 210 (e.g., over a local area network within the cloud computing environment 200).

Upon collecting the performance data, the CSI component 210 could be configured to analyze the performance data to identify a cluster of services having a statistically similar pattern of performance data with respect to one or more performance metrics and within a particular time frame. For example, the CSI component 210 could determine that the web application server's 105 CPU usage metric is elevated and that the CPU usage and requests received metrics for the database service 120 follow the same pattern for a particular window of time. Additionally, the CSI component 210 could determine that the web server's 110 CPU usage metric is also elevated and follows substantially the same pattern. Accordingly, the CSI component 210 could determine that a cluster exists with respect to the web application server's CPU usage metric, the database's CPU usage metric, and the database's requests received metric. Generally, algorithms for automatically detecting a shift in a service's performance metric(s) could include comparing an average level of the most recent "N" minutes with the previous "M" minutes, e.g., where "N" is 15 (minutes), and "M" is 45 (minutes). Additionally, the variance of the metric over an "N" minutes time period could be compared with the variance over a previous "M" minutes period. Other detection methods may involve, for instance, fitting a polynomial or exponential function to the metric, such that sudden increases in the metrics would be indicated by the parameters of the polynomial fit.

Once the cluster of services is identified, the CSI component 210 could determine which one of the services in the cluster is the root cause of the pattern of performance data. For instance, the CSI component 210 could determine dependency information for the services, and could use this dependency information to identify which of the services is causing the behavior indicated by the pattern of performance data. As an example, the CSI component 210 could determine that the web application server 105, the web server 110 and the database 120 are experiencing the same pattern of performance data, and that the web application server 105 depends on the database 120 (i.e., in that web application server operations can be delayed as a result of delays in the database processing submitted queries) and the database 120 depends on the web application server 105 (i.e., in that the database's performance can be directly impacted by the number of queries submitted by the web application server). In such an example, the CSI component 210 could determine that because the database's requests received metric is elevated and because this metric is directly dependent upon the web application server's 105 behavior, the web application server 105 is the root cause of the detected pattern of performance data. In one embodiment, the CSI component 210 is configured to provide a visual indication of the service determined to be the root cause (e.g., by highlighting the service in a displayed interface).

That is, generally speaking, the CSI component 210 can build up a knowledge base of cause and effect information, based on the observed correlations between known dependent services. The CSI component 210 could then use such a knowledge base to classify subsequent failures, based on known patterns of data. For example, if a high correlation is found between certain metrics in a given situation, this set of metrics could be stored as a tuple, and later used in pattern-based classifier to accelerating the process of triaging subsequent problems in production systems.

Generally, the CSI component 210 can be configured to determine the interdependencies of the services in a number of different ways. For example, a user could input (e.g., using an interface of the CSI component 210) the dependency information for each of the services and/or each of the individual performance metrics for the services. In one embodiment, the CSI component 210 is configured to perform an automated discovery operation to determine the dependency information. For example, the CSI component 210 could maintain historical performance data for the services and could determine the dependency information of the various services and/or performance metrics for the services, based on trends in the historical performance data. As another example, the CSI component 210 could observe network packet flow through the network connecting the various services, and could determine dependency information between the services based on the observed network packet flow. More generally, it is broadly contemplated that any technique, known or unknown, for determining dependencies between services can be employed by the CSI component 210.

Once the CSI component 210 has determined a service and performance metric that is most likely to be the root cause of a given pattern of performance data, the CSI component 210 could receive a request to determine which services are currently being affected by the determined service and performance metric. For instance, the CSI component 210 could analyze the collected performance data to identify one or more of the plurality of services and/or performance metrics that are displaying substantially the same pattern of behavior as the determined service and performance metric. As an example, the CSI component 210 could calculate a similarity value, for each performance metric of each of the services, indicative of the similarity between the respective performance metric and the performance metric determined to be the root cause of the pattern. The CSI component 210 could then determine that each performance metric having a calculated similarity value that exceeds a predefined threshold amount of similarity, is being affected by the service and performance metric determined to be the root cause of the pattern of performance data. The CSI component 210 could then present the determined performance metrics to a user, e.g., by highlighting the performance metrics in an interface.

Figure 3:
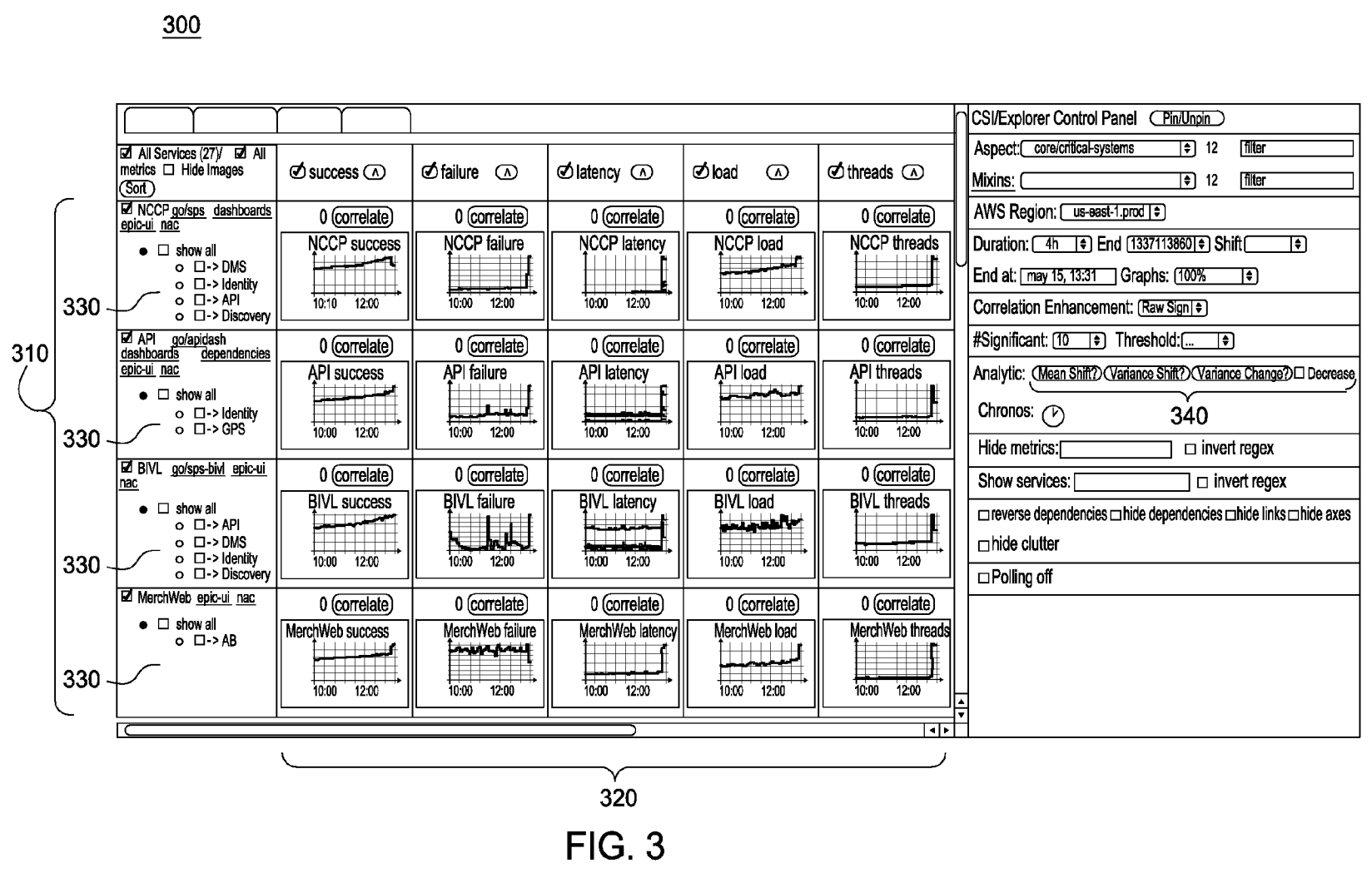

An example of such an interface is shown in FIG. 3, which illustrates an interface for a monitoring component, according to one embodiment described herein. As shown, the interface 300 includes a number of rows 310, where each of the rows corresponds to a respective service. For instance, the first row relates to an NCCP services, the second row relates to an API service, the third row a BIVL service, and the fourth row relates to a MerchWeb web service. Additionally, the interface 300 includes a number of columns 320, where each column relates to a respective performance metric. For instance, the first column relates to a number of successful transactions processed, the second column relates to a number of failed transactions, the third column relates to a measure of latency, the fourth column relates to a measure of load, and the fifth column relates to a number of active threads. Of course, such examples are without limitation and are provided for illustrative purposes only, and more generally it is broadly contemplated that embodiments described herein can be adapted for any type of services, any number of services and any measurable performance metrics, consistent with the functionality described herein.

As shown, the interface 300 includes a graph of performance data for each of the monitored performance metrics. For instance, a respective monitoring component could be deployed for each of the monitored services, and could transmit performance data (directly or indirectly) to the CSI component 210. The CSI component 210 could then use this performance data to update the graphs in the interface 300. The interface 300 also includes dependency information 330 for each of the services. For instance, the dependency information 330 for the NCCP service indicates that the NCCP services is dependent upon a DMS service, an Identity service, an API service and a Discovery service. As discussed above, the dependency information for the services can be manually specified, discovered by the CSI component 210, and so on.

Figure 4:
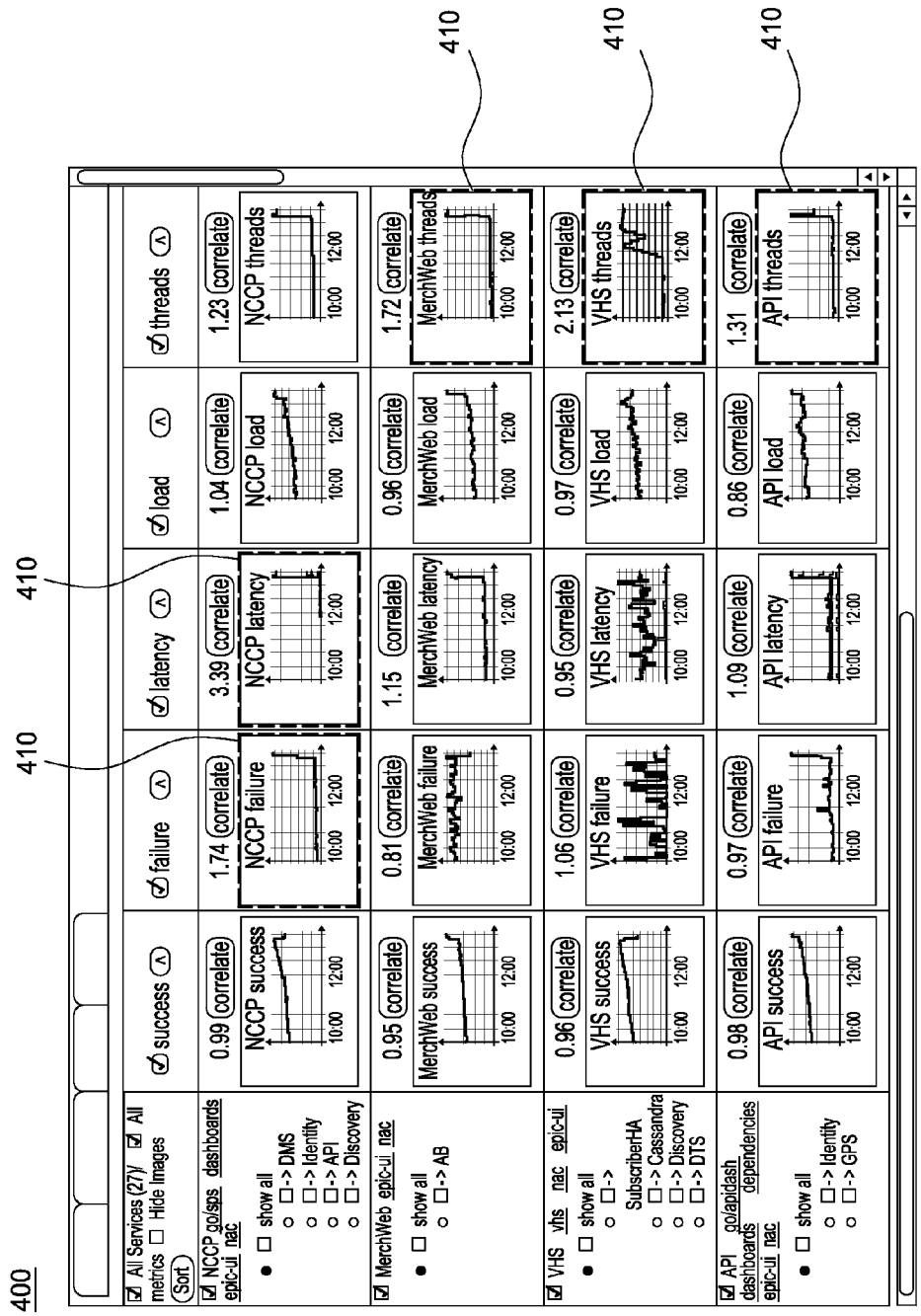
FIG. 4 illustrates an interface for a monitoring component, as it appears following a computed correlation diagnostic, according to one embodiment described herein.

Additionally, as discussed above, the CSI component 210 can be configured to analyze the collected performance data in order to identify a cluster(s) of performance metrics exhibiting statistically similar behavior. The CSI component 210 could then highlight the performance metrics within a cluster in the interface. An example of this is shown in FIG. 4, which illustrates an interface for a monitoring component, according to one embodiment described herein. As shown, the interface 400 includes a multitude of highlighted performance metrics 410. Here, the CSI component 210 has determined that each of the highlighted performance metrics 410 is exhibiting statistically similar behavior, as these performance metrics have recently spiked to a much higher value. Of course, while the present example involves performance metrics suddenly increasing in value, it is broadly contemplated that the clustering algorithm employed by the CSI component 210 could be configured to detect any pattern of performance data.

Once the determined cluster of performance metrics is displayed, a user could select one of the performance metrics to perform a causal analysis on. For purposes of this example, assume that the user selects the correlate button associated with the latency metric for the NCCP service. In response to such a selection for a particular service and performance metric, the CSI component 210 could determine which of the other monitored services and performance metrics is most likely to be the root cause of the pattern of performance data for the selected service and performance metric. In doing so, the CSI component 210 could first determine which other monitored performance metrics are exhibiting statistically similar behavior to the selected performance metric (i.e., NCCP latency in this example).

For example, the CSI component 210 could calculate a Pearson Correlation Coefficient(s) for the collected performance data, in order to identify sets of data having similar visual characteristics. Additionally, the CSI component 210 could be configured to use a pre-filtering technique to enhance the correlation algorithm, allowing the CSI component 210 to better detect spikes, steps, ramps and other trends in the collected data. Such a pre-filter could use, for instance, moving average techniques, in order to improve the correlational analysis. Other examples of the pre-filter could include band-pass and spectrum filters based on Fast Fourier Transforms (FFT) or wavelets determined from the collected data. In one embodiment, the CSI component 210 is configured to apply techniques to compute data similarity in the presence of time-delays, in order to enhance the correlation algorithm. More generally, without limitation, any pattern matching technique for time-series data could be applied in order to identify related signals, and such techniques could be combined with known dependency information in order to induce causation between the various monitored performance metrics.

Figure 5:
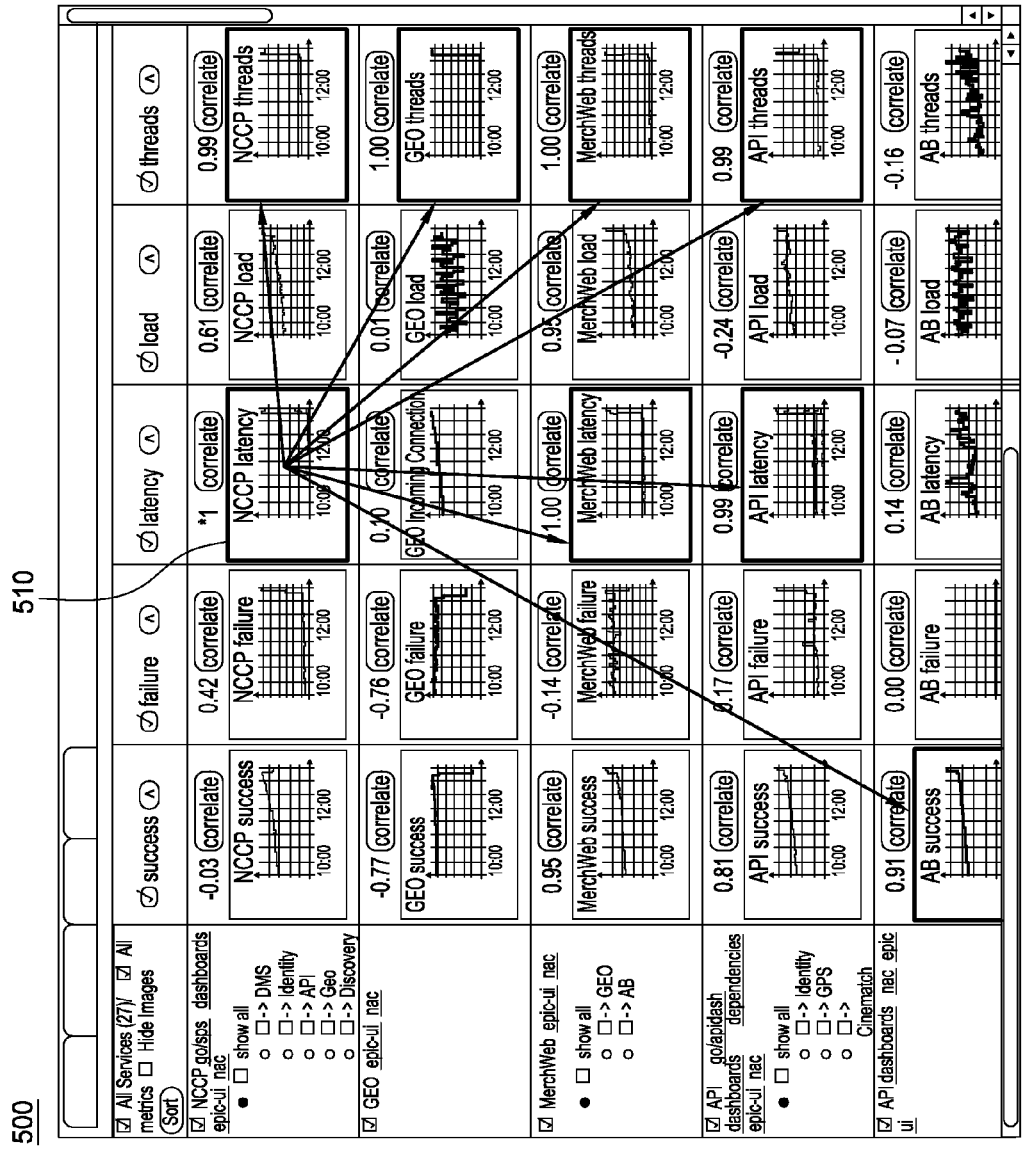
FIG. 5 illustrates an interface for a monitoring component, as it appears following a correlation of a performance metric, according to one embodiment described herein.

An example of the result of such statistical analysis is shown in FIG. 5, which illustrates an interface for a monitoring component, according to one embodiment described herein. As shown, the interface 500 includes the NCCP latency metric 510 and a number of other highlighted metrics that the CSI component 210 has determined exhibit statistically similar behavior to the NCCP latency metric 510. That is, the CSI component 210 has determined that other metrics such as NCCP threads, GEO threads, Merch-Web latency, API latency, etc., are exhibiting statistically similar behavior to the selected NCCP latency metric 510. Accordingly, the CSI component 210 has highlighted these other performance metrics in the interface 500. Advantageously, doing so allows the CSI component 210 to reduce a significant number of distinct performance metrics into a smaller number of significant relationships, thereby increasing the signal-to-noise ratio for problem solving.

Figure 6:
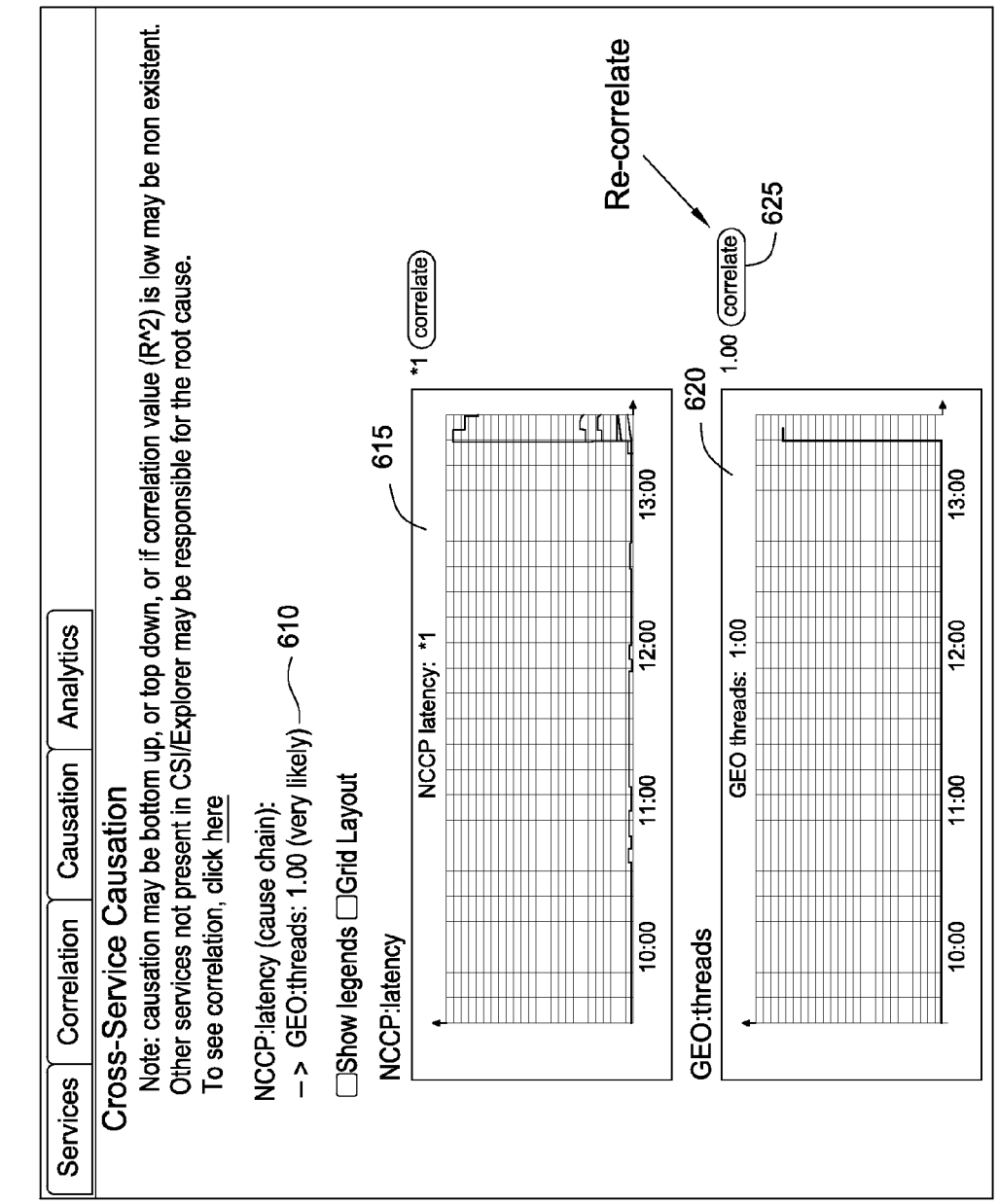
FIG. 6 illustrates an interface for a monitoring component, showing the probable cause of a deviation in a metric based on dependency information, according to one embodiment described herein.

In addition to determining a plurality of other performance metrics that are exhibiting statistically similar behavior to the selected performance metric, the CSI component 210 can also be configured to determine which one of the plurality of performance metrics is most likely the root cause of the pattern of performance data, and could present such information to a user via an interface. As discussed above, the CSI component 210 could make this determination based at least in part on dependency information between the services. FIG. 6 illustrates an example of such an interface for a monitoring component, according to one embodiment described herein. As shown, the interface 600 indicates that the GEO threads metric 610 is the most likely cause of the pattern of performance data exhibited by the cluster of performance metrics. The interface 600 also includes the graph for the NCCP latency metric 615, as well as the graph for the GEO threads metric 620, allowing the user to make a visual inspection of the correlation between these two metrics as well.

The interface 600 further includes a correlate button 625 for the GEO threads metric which, when selected, could perform additional statistical analysis to determine which services and performance metrics are being impacted by the GEO threads metric. Here again, the CSI component 210 could use the dependency information indicative of the various dependencies between the services as part of the statistical analysis. Advantageously, by doing so, the CSI component 210 enables users to not only pinpoint the root cause of a particular problem quickly and efficiently, but to also identify which other services and performance metrics are currently being affected by the determined root cause. The results of such analysis could then be presented to the user.

Figure 7:
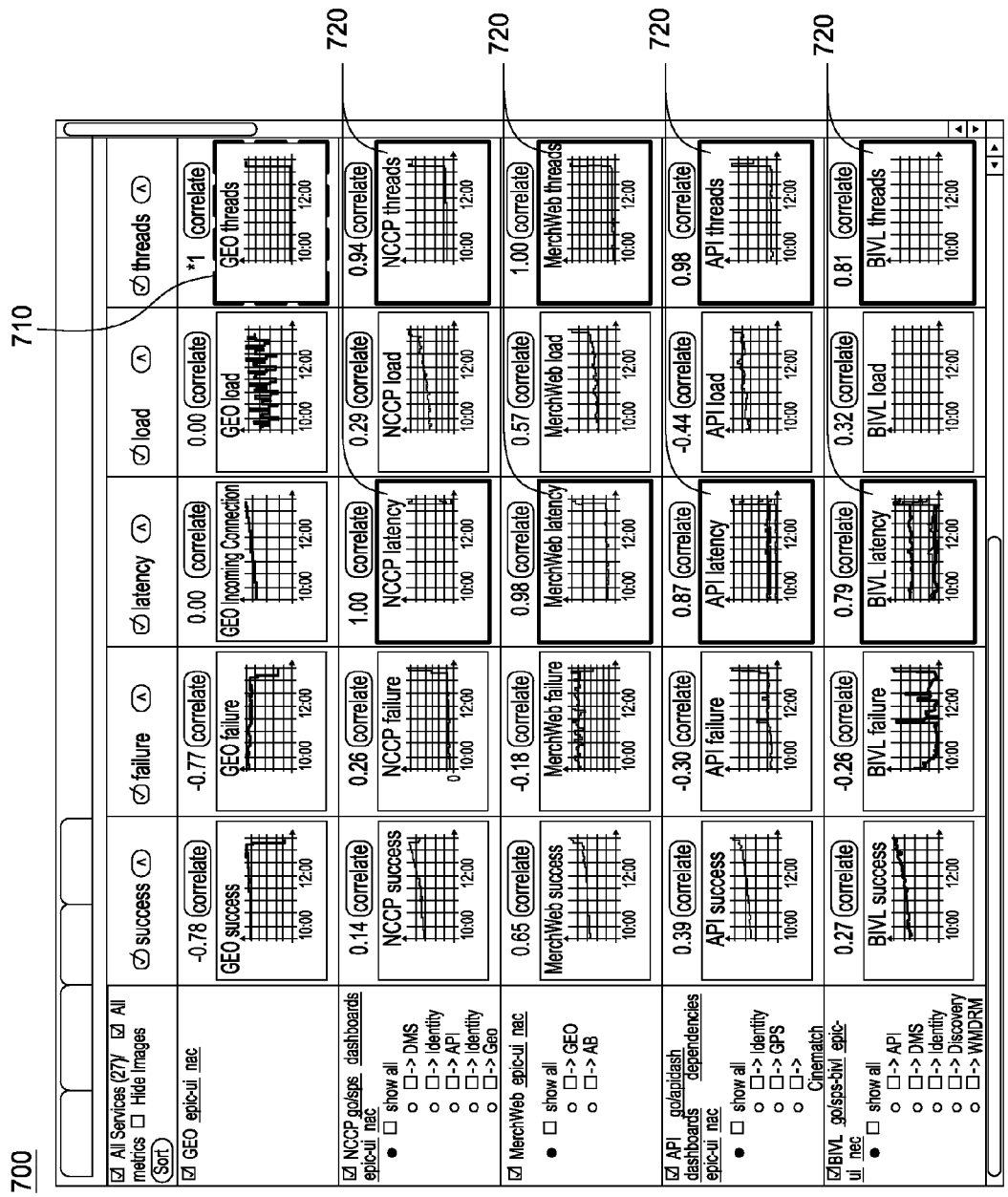
FIG. 7 illustrates an interface for a monitoring component, showing the reversed correlation from a probable cause to dependent services, according to one embodiment described herein.

An example of this is shown in FIG. 7, which illustrates an interface for a monitoring component, according to one embodiment described herein. As shown, the interface 700 includes the GEO threads metric 710 (i.e., the metric determined to be the root cause of the determined cluster's pattern of performance data), highlighted using dashed lines, and also includes the other performance metrics 720 determined to be affected by the GEO threads metric 710. Here, the affected metrics 720 are highlighted using a solid line, which allows users to quickly and easily distinguish these metrics from the root cause metric 710.

Figure 8:
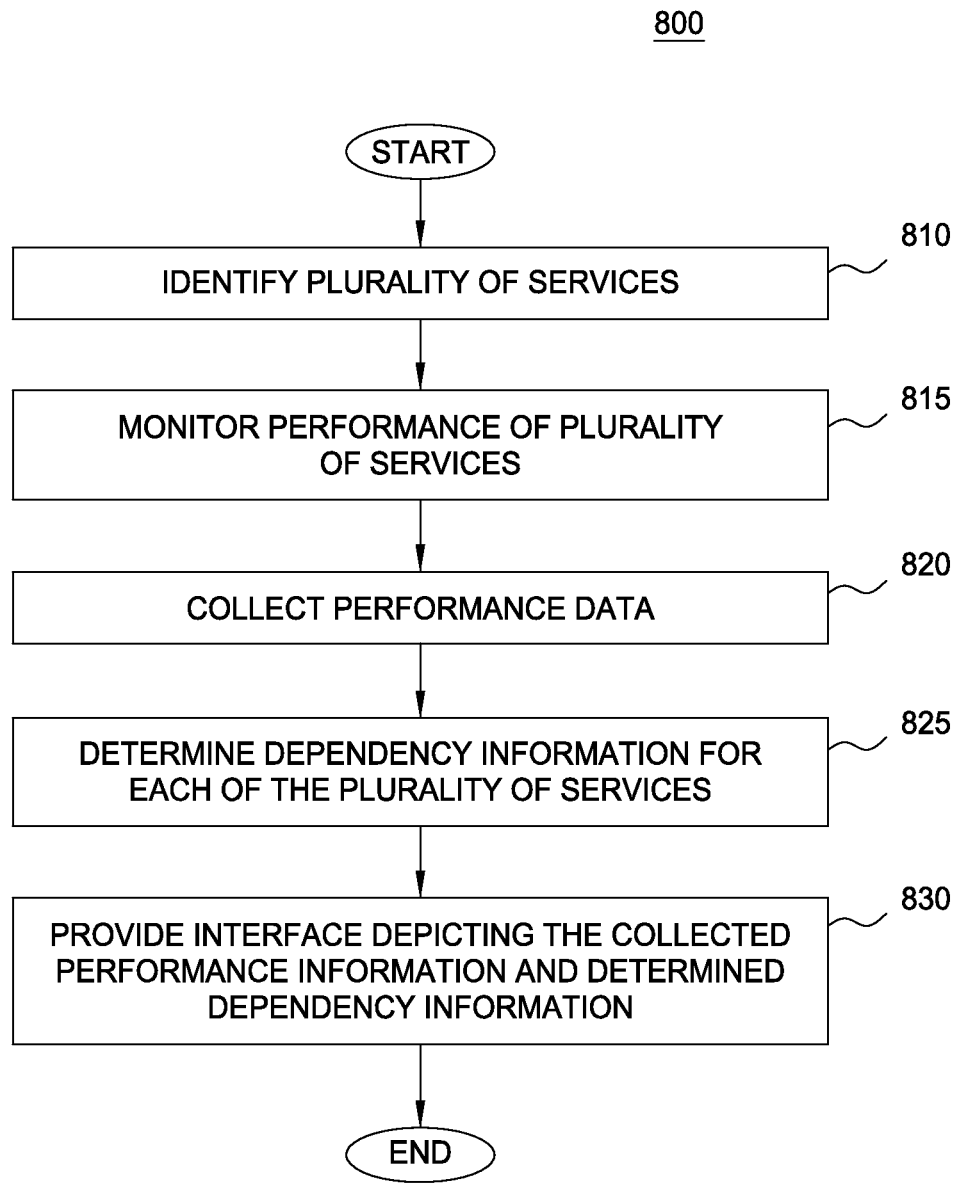
FIG. 8 is a flow diagram illustrating a method of displaying performance information, according to one embodiment described herein.

FIG. 8 is a flow diagram illustrating a method of displaying performance information, according to one embodiment described herein. As shown, the method 800 begins at block 810, where the CSI component 210 identifies a plurality of services. For example, the CSI component 210 could be preconfigured (e.g., by a system administrator) with information regarding the plurality of services. In one embodiment, the CSI component 210 is configured to automatically perform operations to discover one or more of the services. The CSI component 210 then monitors the identified services (block 815). For example, each of the services could be configured with a respective monitoring component that tracks various performance metrics of the service and communicates with the CSI component 210 (e.g., via network communications).

The CSI component 210 then collects performance data for each of the services (block 820). As discussed above, the performance data can include a wide variety of performance metrics for the service, including (but not limited to) CPU utilization, memory utilization, network utilization, workload, requests received over a period of time, requests processed over a period of time, measures of temperature for hardware components and so on. More generally, the CSI component 210 could be configured to collect any measurable performance data.

Additionally, the CSI component 210 determines dependency information for each of the identified services (block 825). Generally, a given service may be said to be dependent upon another service, when the performance of the given service can be influence by the performance (or absence) of the other service. For example, assume that the identified services include a web server and a database, and that the web server hosts a web application that submits queries to the database during execution. In such an example, the web server could be said to be dependent upon the database, as the web server would be influenced (i.e., the queries would fail) in the event the database went offline. In one embodiment, the CSI component 210 could be preconfigured with the dependency information of the services (e.g., by a system administrator).

Once the performance data is collected and the dependency information is determined, the CSI component 210 provides an interface depicting the performance information and the dependency information (block 830). For example, the CSI component 210 could present the interface shown in FIG. 3 and discussed above. Once the interface is displayed, the method 800 ends.

Figure 9:
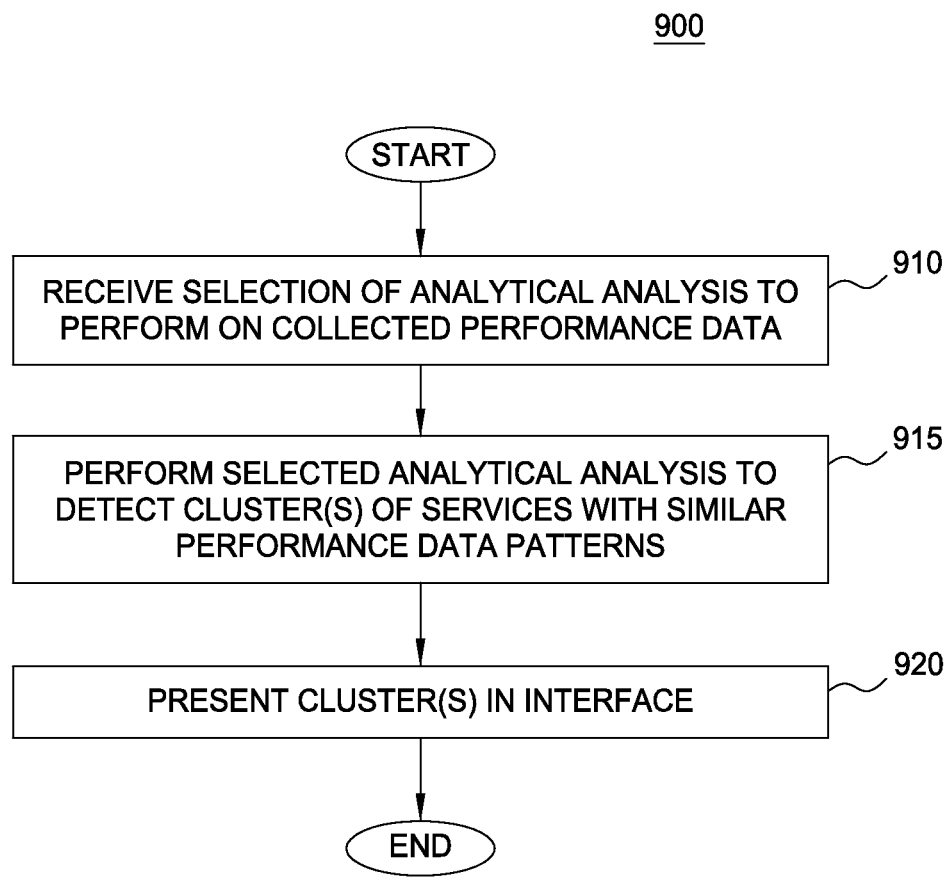
FIG. 9 is a flow diagram illustrating a method of presenting clusters of services based on performance data patterns, according to one embodiment described herein.

FIG. 9 is a flow diagram illustrating a method of presenting clusters of services based on performance data patterns, according to one embodiment described herein. As shown, the method 900 begins at block 910, where the CSI component 210 receives a selection of a particular analytical analysis to perform on the collected performance data for the plurality of monitored services. For instance, the CSI component 210 could be configured to perform a number of different statistical analysis operations on the collected performance data, and the interface could allow users to select one of these statistical analysis operations.

The CSI component 210 then performs the selected statistical analysis on the collected data to identify one or more clusters of the services having statistically similar patterns of performance data (block 915). As discussed above, the CSI component 210 may analyze the performance data to detect services and/or performance metrics having statistically similar behavior. Generally, it is broadly contemplated that the CSI component 210 can be configured to employ any statistical analysis techniques for identifying clusters of statistically similar data can be used.

The CSI component 210 then presents the determined clusters in the interface, and the method 900 ends. For example, the CSI component 210 could highlight the services and/or performance metrics within a cluster using a single color. In such an embodiment, if the CSI component 210 identifies two or more different clusters of services and/or performance metrics having statistically similar behavior, each of the two or more different clusters could be highlighted using a different color. More generally, it is broadly contemplated that any visual indication that identifies two or more services and/or performance metrics as part of a cluster may be used, in accordance with the embodiments described herein.

Figure 10:
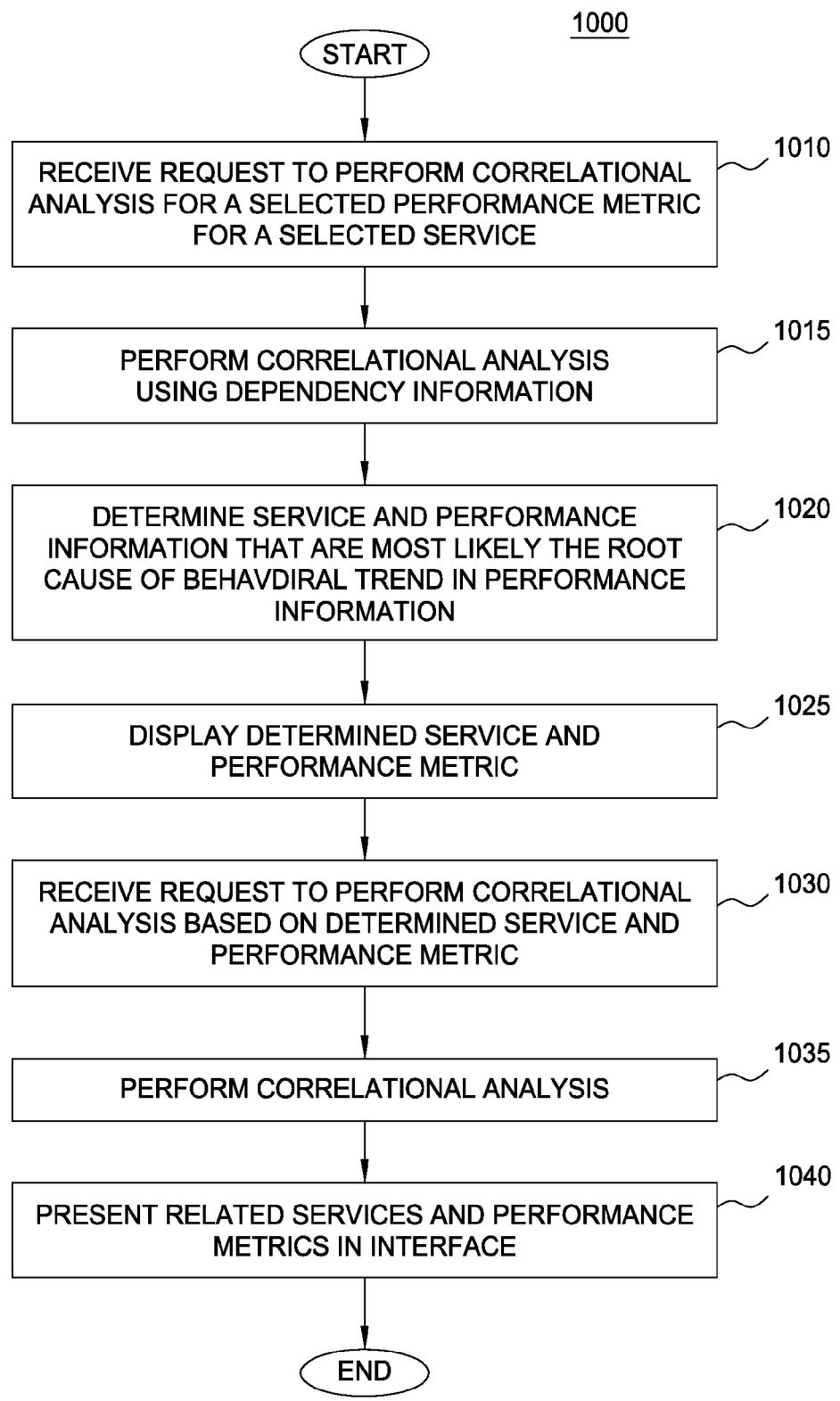
FIG. 10 is a flow diagram illustrating a method of presenting related services based on performance data, according to one embodiment described herein.

FIG. 10 is a flow diagram illustrating a method of presenting related services based on performance data, according to one embodiment described herein. As shown, the method 1000 begins at block 1010, where the CSI component 210 receives a request to perform correlational analysis for a selected performance metric of a particular service. The CSI component 210 then applied the correlational analysis to the collected performance data for the monitored services (block 1015). Generally speaking, the correlational analysis is applied to detect other performance metrics within the same service or pertaining to other services that are statistically similar to the selected performance metric. For example, the CSI component 210 could calculate a similarity value for each of the other performance metrics and other services (e.g., measured as a p-value), indicative of the respective other performance metric's similarity to the selected performance metric. The CSI component 210 could then determine that the performance metrics whose calculated similarity values exceed a predefined threshold amount are statistically similar to the selected performance metric. In one embodiment, the CSI component 210 could use various colors in the displayed interface, to highlight the various related performance metrics. Additionally, the CSI component 210 could sort the interface (e.g., by rows, columns, etc.) in order to highlight the most closely related performance metrics (e.g., by displaying the most closely related performance metrics at the top of the user interface).

The CSI component 210 then determines a service and/or performance metric(s) that is most likely to be the root cause of the behavioral trend in the identified cluster of services and/or performance metrics (block 1020). In making this determination, the CSI component 210 may consider the dependency information of the services. For example, assume that services A, B and C are identified as part of a behavioral cluster, and further assume that service A depends on service B and that service B depends on service C. In this example, the CSI component 210 could determine that service B is the cause of service A's behavior (i.e., because service A depends on service B), and could further determine that service C is the cause of service B's behavior (i.e., because service B depends on service C). Accordingly, the CSI component 210 could determine that service C is the root cause of this cluster's behavior in this example.

The CSI component 210 then presents the determined service and/or performance metric in the interface (block 1025). For example, the CSI component 210 could present the interface 600 shown in FIG. 6 and discussed above. More generally, it is broadly contemplated that any interface or method of indicating the determined service as the likely root cause of the problem can be used, in accordance with the embodiments described herein.

The CSI component 210 then receives a request to perform further correlational analysis to identify other services that are statistically similar to the service determined to be the root cause of the pattern of performance data (block 1030). That is, the CSI component 210 receives a request to determine which of the other services and/or performance metrics are affected by the service determined to be the root cause. The CSI component 210 then performs the requested correlational analysis (block 1035), and presents the results of the correlational analysis in the interface (block 1040). Advantageously, doing so allows users of the system to quickly and efficiently determine not only which service is most likely to be the root cause of a particular performance data trend, but which other services are being affected by the root service. Once the interface is updated, the method 1000 ends.

Figure 11:
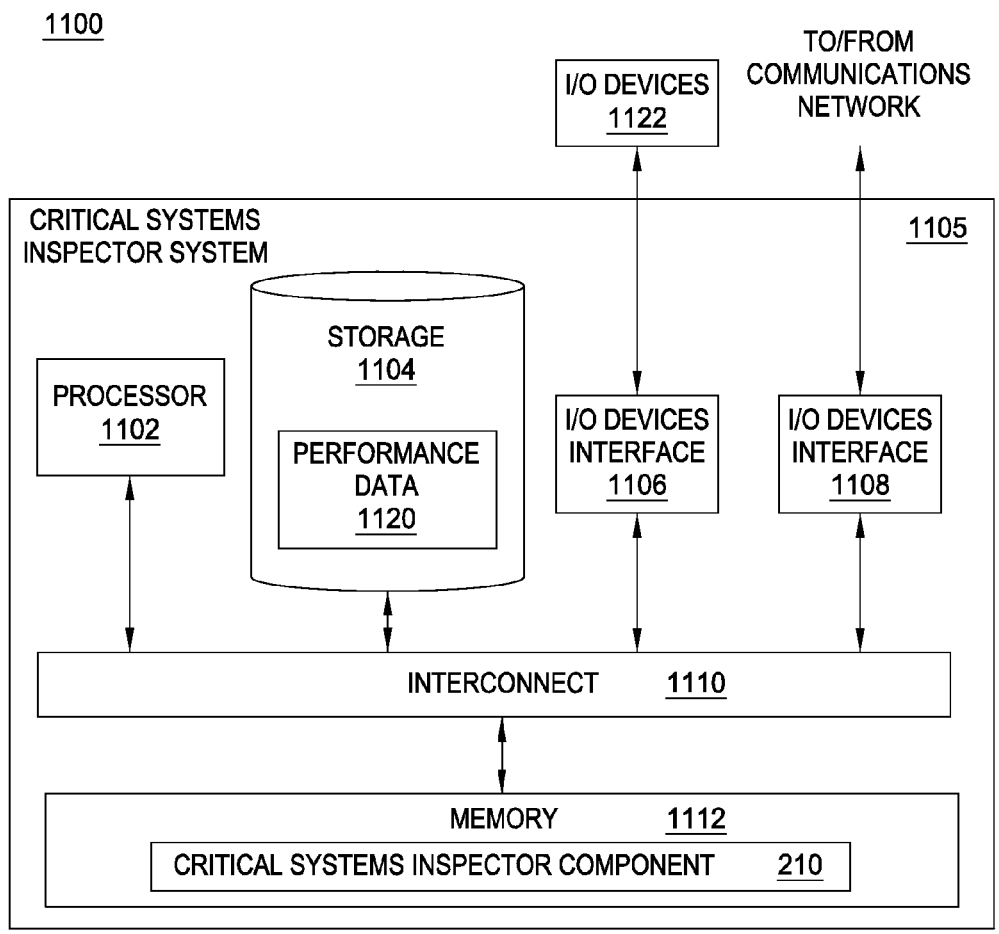
FIG. 11 illustrates a computing system configured with a critical systems inspector component, according to one embodiment described herein.

FIG. 11 illustrates a computing system configured with a critical systems inspector component, according to one embodiment described herein. As shown, the environment 1100 includes a CSI system 1105 which includes, without limitation, a central processing unit (CPU) 1102, a network interface 1108, an interconnect 1110, and a system memory 1112. The CPU 1102 retrieves and executes programming instructions stored in the system memory 1112. Similarly, the CPU 1102 stores and retrieves application data residing in the system memory 1112. The interconnect 1110 facilitates transmission, such as of programming instructions and application data, between the CPU 1102, input/output (I/O) devices interface 1106, storage 1104, network interface 1108, and system memory 1112. The I/O devices interface 1106 is configured to receive input data from user I/O devices 1122. Examples of user I/O devices 1122 may include one of more buttons, a keyboard, and a mouse or other pointing device. The I/O device interface 1106 may also include an audio output unit configured to generate an electrical audio output signal, and user I/O devices may further includes a speaker configured to generate an acoustic output in response to the electrical audio output signal. Another example of an I/O device is a display device that generally represents any technically feasible means for generating an image for display. For example, the display device may be a liquid crystal display (LCD) display, CRT display, or DLP display. The display device may be a TV that includes a broadcast or cable tuner for receiving digital or analog television signals.

CPU 1102 is included to be representative of a single CPU, multiple CPUs, a single CPU having multiple processing cores, and the like. And the system memory 1112 is generally included to be representative of a random access memory. The storage 1104 may be a disk drive storage device. Although shown as a single unit, the storage 1104 may be a combination of fixed and/or removable storage devices, such as fixed disc drives, floppy disc drives, tape drives, removable memory cards, or optical storage, network attached storage (NAS), or a storage area-network (SAN). The network interface 1108 is configured to transmit data via the communications network, e.g., to transmit context tokens and localized digital assets from client devices as well as to return a assembled variation of digital content generated by the dynamic context-based assembler to the client devices.

The system memory 1112 stores a CSI component 210 that is configured to identify a root cause of a pattern of performance data in a system including a plurality of services. For instance, the CSI component 210 could determine dependency information for each of the plurality of services, where at least one of the plurality of services is dependent upon a second one of the plurality of services. Additionally, the CSI component 210 could monitor each of the plurality of services to collect performance data for the respective service. The CSI component 210 could further analyze the performance data to identify a cluster of services that each follow a pattern of performance data. The CSI component 210 could then determine that a first one of the services in the cluster of services is the root cause of the pattern of performance data, based on the determined dependency information for each of the plurality of services.

Additionally, the embodiments described herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a plurality of interrelated services could be deployed within the cloud computing environment, and the CSI component 210 could collect performance data from the plurality of interrelated services. The CSI component 210 could then analyze the performance data to determine a cluster of services having statistically similar performance data, and could further determine one of the cluster of services to be the root cause of the pattern of performance data, based on dependency information for the plurality of services. Doing so allows a user to analyze the performance information for the plurality of services and to efficiently identify one of the services as the root cause of a particular problem and/or pattern of performance data, from any computing system attached to a network connected to the cloud (e.g., the Internet). In addition to monitoring other services, the CSI component 210 may also be used to monitor its own performance (e.g., within the cloud-based services oriented architecture).

In the preceding, reference is made to embodiments of the invention. However, it should be understood that the present disclosure is not limited to specific described embodiments. Instead, any combination of the preceding features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, any reference to "the invention" shall not be construed as a generalization of any inventive subject matter disclosed herein and shall not be considered to be an element or limitation of the appended claims except where explicitly recited in a claim(s).

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

Therefore, the scope of the present invention is determined by the claims that follow.

We claim:
1. A method, comprising:
monitoring a plurality of services;
collecting performance data for each service included in the plurality of services;
identifying, by operation of one or more computer processors, a cluster of related services by analyzing the performance data and determining that each service included in the cluster of related services exhibits a statistically similar pattern of performance data with respect to one or more performance metrics, wherein a first service is included in the cluster of related services, by:
  calculating a similarity value for at least one service included in the plurality of services that is indicative of a statistical similarity between the performance data of the service and at least one of the performance data of the first service, the performance data of a second service, and a predetermined statistical pattern, and
  determining that the similarity values calculated for each service included in the cluster of related services exceed a predetermined threshold amount of similarity; and
determining, by operation of one or more computer processors, that the first service is a root cause of the pattern of performance data for each service included in the cluster of related services by determining that each service included in the cluster of related services, other than the first service, depends, either directly or indirectly, on the first service.

2. The method of claim 1, further comprising outputting an interface for display that includes an indication of the first service determined to be the root cause of the pattern of performance data.

3. The method of claim 2, wherein outputting the interface for display, further comprises including an indication of a set of related services in the interface, wherein the interface is sorted such that the set of related services are adjacent to the first service determined to be the root cause of the pattern of performance of performance data.

4. The method of claim 1, further comprising determining dependency information for each service included in the plurality of services by performing an automated discovery operation to determine the dependency information.

5. The method of claim 1, further comprising:
upon determining the first service is the root cause of the pattern of performance data, receiving a request from a user to determine services within the plurality of services that are being affected by the first service;
analyzing the performance data to identify one or more of the plurality of services that are affected by the first service; and
outputting for display an indication of the one or more services.

6. The method of claim 5, wherein analyzing the performance data to identify one or more of the plurality of services that are affected by the first service further comprises:
calculating a similarity value for each service included in the plurality of services indicative of a statistical similarity between the respective service and the first service; and
determining that the similarity values calculated for the one or more services exceed a predetermined threshold amount of similarity.

7. The method of claim 1, wherein:
monitoring each service included in the plurality of services comprises deploying a respective monitoring agent for each of the plurality of services, wherein each of the monitoring agents is configured to monitor a plurality of performance metrics for the respective service, and
determining that the first service is a root cause of the pattern of performance data comprises determining one or more of the plurality of performance metrics, collected for the first service, that is the root cause of the pattern of performance data.

8. The method of claim 1, wherein determining that the first service is a root cause of the pattern of performance data further comprises determining that each service included in the cluster of related services depends on the first service.

9. A non-transitory computer-readable medium including instructions that, when executed by a processor, cause the processor to perform one or more operations comprising:
monitoring a plurality of services;
collecting performance data for each service included in the plurality of services;
identifying, by operation of one or more computer processors, a cluster of related services by analyzing the performance data and determining that each service included in the cluster of related services exhibits a statistically similar pattern of performance data with respect to one or more performance metrics, wherein a first service is included in the cluster of related services, by:
calculating a similarity value for at least one service included in the plurality of services that is indicative of a statistical similarity between the performance data of the service and at least one of the performance data of the first service, the performance data of a second service, and a predetermined statistical pattern, and
determining that the similarity values calculated for each service included in the cluster of related services exceed a predetermined threshold amount of similarity; and
determining, by operation of one or more computer processors, that the first service is a root cause of the pattern of performance data for each service included in the cluster of related services by determining that each service included in the cluster of related services, other than the first service, depends, either directly or indirectly, on the first service.

10. The non-transitory computer-readable medium of claim 9, the one or more operations further comprising outputting an interface for display that includes an indication of the first service determined to be the root cause of the pattern of performance data.

11. The non-transitory computer-readable medium of claim 10, wherein outputting the interface for display, further comprises including an indication of a set of related services in the interface, wherein the interface is sorted such that the set of related services are adjacent to the first service determined to be the root cause of the pattern of performance of performance data.

12. The non-transitory computer-readable medium of claim 9, the one or more operations further comprising determining dependency information for each service included in the plurality of services by performing an automated discovery operation to determine the dependency information.

13. The non-transitory computer-readable medium of claim 9, the one or more operations further comprising:
upon determining the first service is the root cause of the pattern of performance data, receiving a request from a user to determine services within the plurality of services that are being affected by the first service;
analyzing the performance data to identify one or more of the plurality of services that are affected by the first service; and
outputting for display an indication of the one or more services.

14. The non-transitory computer-readable medium of claim 13, wherein analyzing the performance data to identify one or more of the plurality of services that are affected by the first service further comprises:
calculating a similarity value for each service included in the plurality of services indicative of a statistical similarity between the respective service and the first service; and
determining that the similarity values calculated for the one or more services exceed a predetermined threshold amount of similarity.

15. The non-transitory computer-readable medium of claim 9, wherein:
monitoring each service included in the plurality of services comprises deploying a respective monitoring agent for each of the plurality of services, wherein each of the monitoring agents is configured to monitor a plurality of performance metrics for the respective service, and
determining that the first service is a root cause of the pattern of performance data comprises determining one or more of the plurality of performance metrics, collected for the first service, that is the root cause of the pattern of performance data.

16. A system, comprising:
a processor; and
a memory including instructions that, when executed by the processor, cause the processor to perform one or more operations comprising:
monitoring a plurality of services;
collecting performance data for each service included in the plurality of services;
identifying, by operation of one or more computer processors, a cluster of related services by analyzing the performance data and determining that each service included in the cluster of related services exhibits a statistically similar pattern of performance data with respect to one or more performance metrics, wherein a first service is included in the cluster of related services, by:
calculating a similarity value for at least one service included in the plurality of services that is indicative of a statistical similarity between the performance data of the service and at least one of the performance data of the first service, the performance data of a second service, and a predetermined statistical pattern, and
determining that the similarity values calculated for each service included in the cluster of related services exceed a predetermined threshold amount of similarity; and
determining that the first service is a root cause of the pattern of performance data for each service included in the cluster of related services by determining that each service included in the cluster of related services, other than the first service, depends, either directly or indirectly, on the first service.

17. The system of claim 16, the operation further comprising outputting an interface for display that includes an indication of the first service determined to be the root cause of the pattern of performance data.

18. The system of claim 17, wherein outputting the interface for display, further comprises including an indication of a set of related services in the interface, wherein the interface is sorted such that the set of related services are adjacent to the first service determined to be the root cause of the pattern of performance of performance data.

19. The system of claim 16, the one or more operations further comprising determining dependency information for each service included in the plurality of services by performing an automated discovery operation to determine the dependency information.

20. The system of claim 16, further comprising:
upon determining the first service is the root cause of the pattern of performance data, receiving a request from a user to determine services within the plurality of services that are being affected by the first service;
analyzing the performance data to identify one or more of the plurality of services that are affected by the first service; and
outputting for display an indication of the one or more services.

21. The system of claim 20, wherein analyzing the performance data to identify one or more of the plurality of services that are affected by the first service further comprises:
calculating a similarity value for each service included in the plurality of services indicative of a statistical similarity between the respective service and the first service; and
determining that the similarity values calculated for the one or more services exceed a predetermined threshold amount of similarity.

22. The system of claim 16, wherein:
monitoring each service included in the plurality of services comprises deploying a respective monitoring agent for each of the plurality of services, wherein each of the monitoring agents is configured to monitor a plurality of performance metrics for the respective service, and
determining that the first service is a root cause of the pattern of performance data comprises determining one or more of the plurality of performance metrics, collected for the first service, that is the root cause of the pattern of performance data.

23. A method, comprising:
determining dependency information for each of a plurality of services, wherein at least one of the plurality of services is dependent upon a first one of the plurality of services;
collecting performance data for each respective service of the plurality of services;
analyzing, by operation of one or more computer processors, the performance data to identify a cluster of services that each follow a pattern of performance data;
determining the first one of the services in the cluster of services is a root cause of the pattern of performance data, based on the determined dependency information for each of the plurality of services;
upon determining the first service is the root cause of the pattern of performance data, receiving a request to determine services within the plurality of services that are being affected by the first service; and
analyzing the performance data to identify one or more of the plurality of services that are affected by the first service determined to be the root cause of the pattern of performance data by:
calculating a similarity value for each of the plurality of services, indicative of a statistical similarity between the respective service and the first service, and
determining that the similarity values calculated for the one or more services exceed a predetermined threshold amount of similarity.

* * * * *